(12) United States Patent
Kim

(10) Patent No.: US 7,154,473 B2
(45) Date of Patent: *Dec. 26, 2006

(54) METHOD FOR CONTROLLING POSITION OF INDICATOR

(75) Inventor: Phil-Tae Kim, Seoul (KR)

(73) Assignee: Samsung Electronics, Co., Ltd., Suwon-si (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,300

(22) Filed: Oct. 15, 1999

(65) Prior Publication Data

US 2002/0122027 A1    Sep. 5, 2002

(30) Foreign Application Priority Data

Oct. 15, 1998    (KR) .................................. 98-43162

(51) Int. Cl.
*G09G 5/08*    (2006.01)
(52) U.S. Cl. ...................... 345/157; 345/160; 715/841
(58) Field of Classification Search ................ 345/167, 345/157, 169, 160, 164, 902; 725/43, 40; 715/858, 856, 841, 810; 348/14.02, 14.05, 348/333.02; 341/176
See application file for complete search history.

(56) References Cited

U.S. PATENT DOCUMENTS

| | | | |
|---|---|---|---|
| 4,679,137 A * | 7/1987 | Lane et al. .................... 700/83 |
| 5,198,802 A * | 3/1993 | Bertram et al. ............. 715/860 |
| 5,283,562 A * | 2/1994 | Kaneko et al. ............. 345/671 |
| 5,448,240 A | 9/1995 | Morito ........................ 341/176 |
| 5,457,446 A | 10/1995 | Yamamoto ............. 340/825.24 |
| 5,488,427 A | 1/1996 | Kayashima et al. ........ 348/569 |
| 5,532,753 A | 7/1996 | Buchner et al. ............ 348/569 |
| 5,543,857 A * | 8/1996 | Wehmeyer et al. ......... 348/589 |
| 5,581,685 A * | 12/1996 | Sakurai ...................... 345/146 |
| 5,585,865 A | 12/1996 | Amano et al. |
| 5,648,781 A * | 7/1997 | Choi .......................... 341/176 |
| 5,751,283 A | 5/1998 | Smith |
| 5,751,373 A | 5/1998 | Ohyama et al. |
| 5,754,177 A * | 5/1998 | Hama et al. ................. 345/862 |
| 5,760,776 A * | 6/1998 | McGurrin et al. .......... 345/353 |
| 5,812,937 A * | 9/1998 | Takahisa et al. ........... 455/66.1 |
| 5,822,123 A * | 10/1998 | Davis et al. .................. 725/43 |
| 5,929,932 A * | 7/1999 | Otsuki et al. ................. 725/47 |
| 5,982,364 A * | 11/1999 | Beckwith .................... 345/723 |
| 5,988,851 A * | 11/1999 | Gent .......................... 364/188 |

(Continued)

FOREIGN PATENT DOCUMENTS

EP    0 537 097 A    4/1993

(Continued)

OTHER PUBLICATIONS

English Language Abstract of European Patent Application EP 665 489 A3 published Aug. 2, 1995 corresponding to Kenneth et al.

(Continued)

*Primary Examiner*—Richard Hjerpe
*Assistant Examiner*—Abbas Abdulselam
(74) *Attorney, Agent, or Firm*—Robert E. Bushnell, Esq.

(57) ABSTRACT

An apparatus and process for controlling the position of an indicator in a user interface using a menu is disclosed. By the method, when a menu having items selected and adjusted by an indicator is displayed, and the position and a size of the menu are changed, the indicator follows the changed menu. Thus, an interface can be easily realized.

32 Claims, 12 Drawing Sheets

U.S. PATENT DOCUMENTS

| | | | | |
|---|---|---|---|---|
| 5,999,730 A | * | 12/1999 | Lewis | 345/435 |
| 6,186,630 B1 | * | 2/2001 | Miyashita | 353/42 |
| 6,320,599 B1 | * | 11/2001 | Sciammarella et al. | 345/667 |
| 6,357,043 B1 | * | 3/2002 | Ellis et al. | 725/61 |
| 6,486,792 B1 | * | 11/2002 | Moster et al. | 340/825.19 |
| 6,515,680 B1 | * | 2/2003 | Hendricks et al. | 715/716 |
| 6,618,063 B1 | * | 9/2003 | Kurtenbach | 345/834 |

FOREIGN PATENT DOCUMENTS

| | | |
|---|---|---|
| EP | 0 840 504 A | 5/1998 |
| JP | 4-110892 | 4/1992 |
| JP | 7-234772 | 9/1995 |
| JP | 09 121316 A | 5/1997 |

OTHER PUBLICATIONS

Japanese Office Action dated Oct. 23, 2001 of the Japanese Patent Application No. 11-292875.

"Search Report" issued by European Patent Office dated on Aug. 7, 2003.

"OS/2 Version 2.0-vol. 2: DOS and Windows Environment," OS/2 Version 2.0 DOS and Windows Environment. Boca Raton, IBM. US, vol. 2, 128-153 pages, XP002173368, p. 3, Paragraph 40-p. 5, by Beck et al. on 1992.

Communication from European Patent Office in applicant's corresponding Application No. 99 120 479.3-2211 issued on the 22nd Jan. 2004.

* cited by examiner

METHOD FOR CONTROLLING POSITION OF INDICATOR

CLAIM OF PRIORITY

This application makes reference to, incorporates the same herein, and claims all benefits accruing under 35 U.S.C. §119 from an application entitled *Method for Controlling Position of Indicator* earlier filed in the Korean Industrial Property Office on Oct. 15 1998, and there duly assigned Ser. No. 98-43162 by that Office.

BACKGROUND OF THE INVENTION

1. Field of the Invention

The present invention relates to an interface apparatus and process using menus, and more particularly, to an apparatus and process for controlling the position of an indicator on the screen of a video display device.

2. Description of the Related Art

Different circuits and processes enabling a user to interface with an appliance by using menus has been widely used for information processing devices such as computers and television receivers. In these interface methods, the requirement of a user is received through menus displayed on a screen, and a desired item is selected by moving an indicator such as a pointer. The indicator is usually a typical pointer, and a work or task bar which is inverted or highlighted. The pointer is operated by a trackball or a joy stick installed on a remote controller, and the bar is operated by a channel up and down key or a volume up and down key installed on a controller or a panel.

For instance, in a television receiver having a small number of selectable channels, a particular channel is selected via one of ten keys or a channel up and down button of the remote controller, but in a digital television receiver having substantially more selection channels, programs of various channels are obtained through a program guide screen, and a specific channel for a particular program is selected through a pointer. Adjustment of display, time setting, and control of volume as well as channel selection can be interfaced through a menu.

In the interface method using menus, when a selected menu item has sub menus or adjustment items, corresponding sub menus are displayed on the screen. For instance, for the control of volume, sub menus for selecting left/right/center/surround speakers are displayed. When the left speaker is selected, a slide-bar displays an adjustment screen for adjusting the volume of the left speaker.

A user selects a desired sub menu item from the displayed sub menus or moves a pointer for changing the adjustment state.

However, in the conventional interface method, the sub menus are displayed but the pointer is located in a position in which main menu items are selected so that the pointer must be moved to an area where the sub menus are displayed. When the sub menus are displayed in a position far from the main menu, an excessive amount of time is wasted in moving the pointer, which causes inconvenience in interfacing with a user.

Also, in the conventional interface method, even if the position and the scale of the menu are changed, the position of the pointer is not changed so that the pointer must be moved by a user to an area where the changed menu is displayed. In the case of using a cursor controller such as trackball or a remote controller to operate a pointer, when the response is very slow, the amount of time taken to move the pointer is increased so that the interface method using menus may be regarded as being difficult.

An exemplar of the contemporary, Choi (U.S. Pat. No. 5,648,781, *Method and Apparatus for Remotely Controlling Electrical Appliances Using a Trackball and Display*, Jul. 15, 1997) discloses a remote control method and apparatus. The remote control for electrical appliances has a trackball used to select functions using control menus. The movement for the pointer is fully dependent upon a user's movement of the trackball. The initial location of the pointer is not limited to the menu area. The pointer can be anywhere on the display screen. When a user goes to a submenu and then reverts back to the main menu, the pointer does not follow the menu area. A user has to make extra steps in having to move the trackball to find the previous menu area.

Morito (U.S. Pat. No. 5,448,240, *Remote Control Input Device*, Sep. 5, 1995) discloses an input device comprised of a rotatable cylinder shape. The device is limited to a direction on one axis at a time. Free movement in all directions of a pointer device is not allowed.

Kayashina et al. (U.S. Pat. No. 5,488,427, *Television System Including Television Set, and Accessory Devices Controlled by a Single Remote Control Device*, Jan. 30, 1996) discloses a television system having method and apparatus for selecting preset or use determined devices. A remote control device is shown to have buttons to display and select an on screen menu. Menu items are selecting by selecting the corresponding buttons on the remote control. The item selected is shown on the display. A problem with Kayashima et al. '427 is that it requires too many buttons for rapidly and conveniently controlling a television.

Yamamoto (U.S. Pat. 5,457,446, *Control Bus System with Plural Controllable Devices*, Oct. 10, 1995) discloses a control bus system for a home entertainment system. The control bus further includes a display means for displaying the features to be executed by the control bus. A cursor is moved to display item to be selected. Yamamoto '446, requires extra movement to locate the area to be selected.

Buchner et al. (U.S. Pat. No. 5,532,753, *Remote-Controlled On-Screen Audio/Video Receiver Control Apparatus*, Jul. 2, 1996) discloses a remote controlled device that displays its options on a display screen. The pointer is controlled by apparatus like a trackball, joy stick or touch panel. The pointer is freely moving with the control screen. Buchner et al. '753 does not store the area location of a previous menu so when a user reverts to an old menu, the pointer is not situated in same area.

I have found that in devices such as a digital television having many selection and adjustment items which cannot be smoothly operated by direct operation of a key, the interface using menus is very important for marketing the devices, so that ensuring of quick response for selecting menus is very important.

SUMMARY OF THE INVENTION

It is an object of the present invention to provide a method of controlling the position of an indicator in an interface using a menu in which an indicator follows to the menu in accordance with the generation and change of the menu, to thereby ensure quick response for selecting the menu.

According to an embodiment of the method for controlling the position of an indicator of the present invention, to achieve the above object, when a menu having items selected and adjusted by the indicator is displayed, and an item having sub-items capable of being selected and adjusted is selected, the sub-items are displayed and the indicator is located in the area where the sub-items are displayed.

According to another embodiment of the method for controlling the position of an indicator of the present invention, to achieve the above object, when a menu having items selected and adjusted by an indicator is displayed, and the position and a size of the menu are changed, the indicator follows the changed menu.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Figure 1:
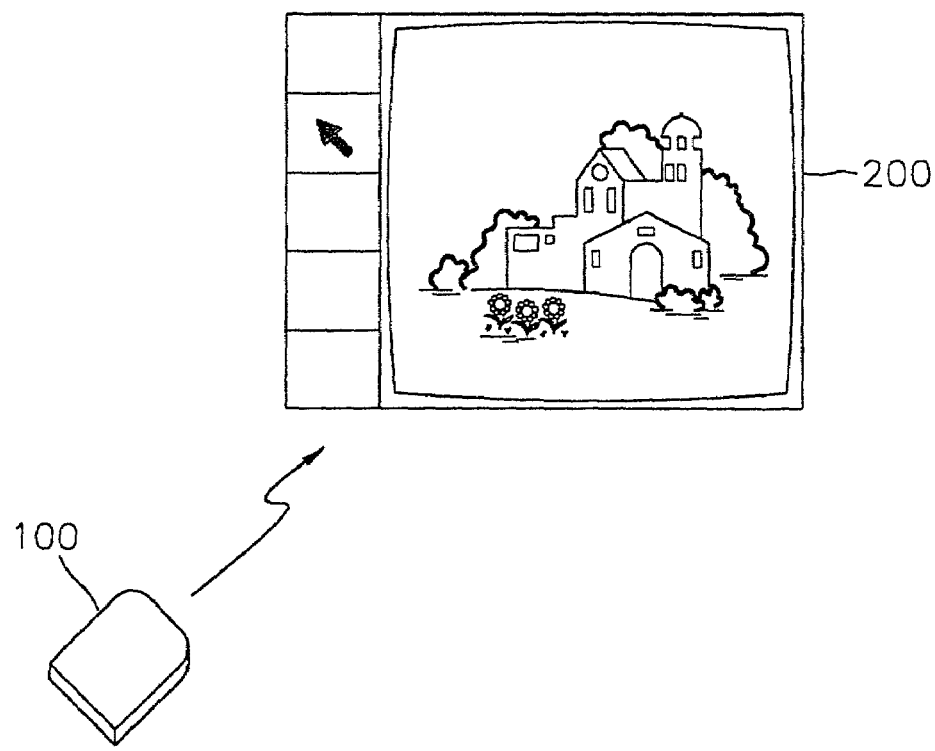
FIG. 1 is a view for conceptually showing an interface method using menus.

FIG. 1 conceptually shows a interface method in which the television receiver is controlled by a remote controller. The television receiver 200 is controlled by the remote controller 100 of FIG. 1. The television receiver 200 displays a menu screen for a user's selection, and a desired item is selected from the menu items displayed on the screen by a pointer. Also, the desired item can be selected from the menu items displayed on the screen by operation of an inverted or highlighted bar. The display screen can be for example a cathode ray tube, liquid crystal display, projection screen, or any other similar display devices.

Figure 2:
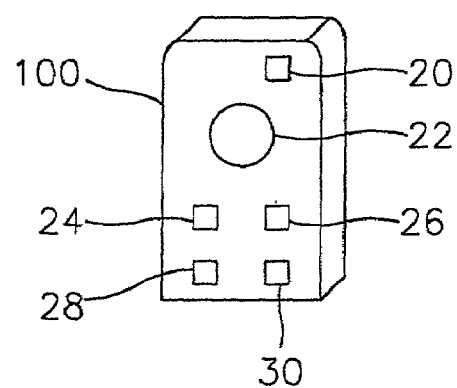
FIG. 2 shows the appearance of the remote controller of FIG. 1.

Referring to FIG. 2, a remote controller includes a power supply key 20, a trackball 22, a selection key 24, a menu key 26, an enlargement and reduction key 28, and a program guide key 30. The menu key 26 is a key for displaying a main menu on a screen, the trackball 22 is a device for moving the pointer displayed on the screen, and the selection key is a key for selecting a menu item on which the pointer is located. Other pointing devices or cursor controllers may be used like a mouse, touchpad, and joy stick. The enlargement and reduction key 28 is a key for enlarging or reducing the size of the menu displayed on the screen, and the program guide key 30 is a key for displaying program guide information on the screen. The pointer can be moved by a joystick, a channel up and down key or a volume up and down key as well as the trackball 22.

In the television receiver 200, a main menu is displayed on the screen or erased in response to pressing the menu key 26. That is, the menu key 26 operates as a toggle key. When the menu is displayed on the screen, the pointer for selecting the menu also is displayed.

In the television receiver 200, the position of the pointer displayed on the screen is controlled in response to operation of the trackball 22, and operation allocated to the menu item on which the pointer is located is performed in response to the selection key 24. If the selected menu item includes sub menus, the sub menus are displayed.

In the television receiver 200, the size of a menu is enlarged or reduced in response to the enlargement and reduction key 28. In order to reduce the size of the menu, a screen is divided into two parts. A program image is displayed in one part, and a menu is displayed in the other part. In order to enlarge the size of the menu, the enlarged menu is displayed on the screen.

The remote controller 100 periodically detects the position of the trackball 22 to control the position of the pointer, and transmits changes in position corresponding to the detected position. That is, the remote controller 100 reads the direction to which the pointer is to be moved, through the trackball 22, and transmits a signal that moves the pointer in the same direction as the trackball 22. For instance, when a user moves the trackball 22 to the left for three seconds, the signal for periodically moving the pointer to the left is transmitted to the television receiver 200 for three seconds.

In the television receiver 200, the position of the pointer is changed in response to the signal transmitted from the remote controller 100. When the pointer is located on the item which is to be selected by the pointer, the user presses the selection key 24 of the remote controller 100, and the television receiver 200 performs the command corresponding to the selected item.

Figure 3A:
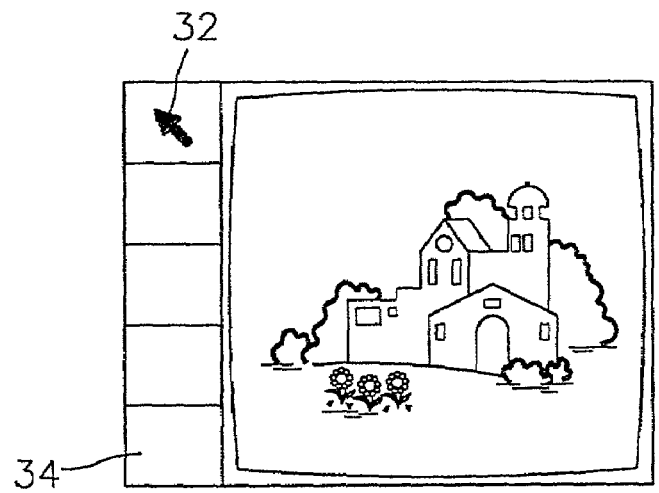
FIG. 3A is an example of a menu screen in the interface method.

FIG. 3A which shows an example of a menu screen in an interface method where a menu is overlapped with a program image. In FIG. 3A, reference numeral 32 denotes a pointer, and reference numeral 34 denotes a main menu.

Figure 3B:
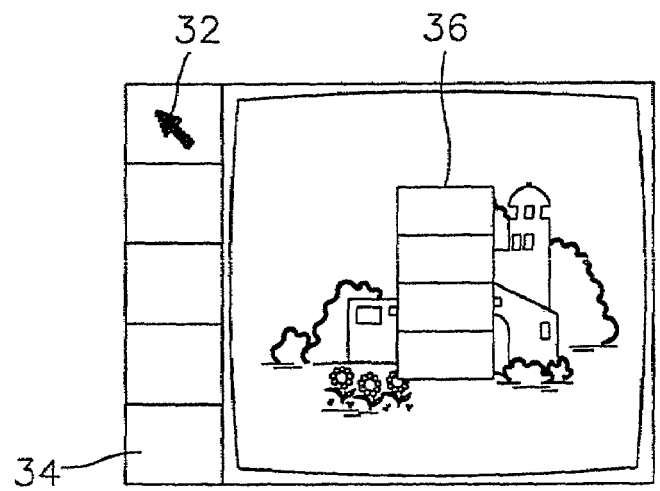
FIG. 3B is a screen when a menu item including a sub menu is selected from the menu of FIG.3A.

3B is a screen after a menu item corresponding to a sub menu has been selected from the main menu 34 of FIG. 3A. In FIG. 3B, reference numeral 36 denotes a sub menu.

In the bar of FIG. 3B, the pointer is located on the selected main menu item.

As shown in FIG. 3B, when the distance between the main menu 34 and the sub menu 36 is long, much time is required for moving the pointer 32 to select a sub menu item.

Figure 4A:
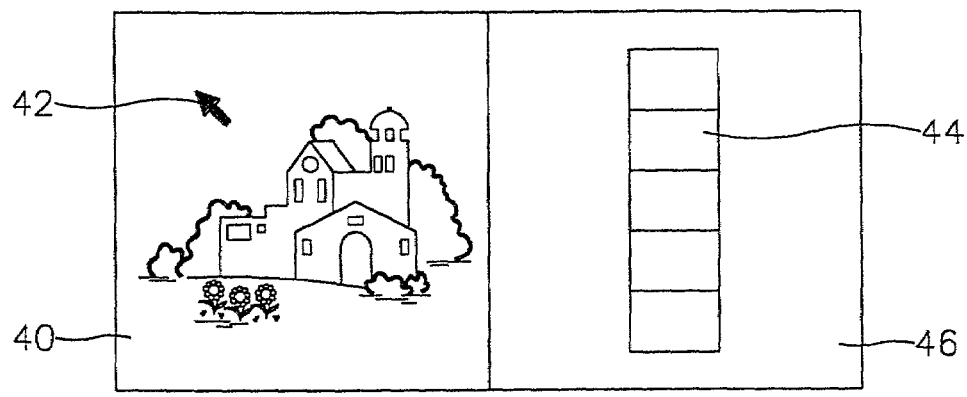
FIG. 4A is another example of a menu screen in the interface method.

Referring to FIG. 4A, in the television receiver 200, the menu reduced in response to the menu key 26 of the remote controller 100 is displayed. In order to display the reduced menu, the screen of the television receiver 200 is divided into two parts. A program image is displayed in one part, and a menu is displayed on the other part.

In FIG. 4A, reference numerals 40, 42, 44 and 46 denote an image where a program image signal is displayed, a pointer, a main menu and an area where the menu is displayed, respectively.

As shown in FIG. 4A, the pointer 42 is located in a position before the menu is displayed. Thus, in order to select a menu item, the pointer 42 must be moved to the menu 44.

Figure 4B:
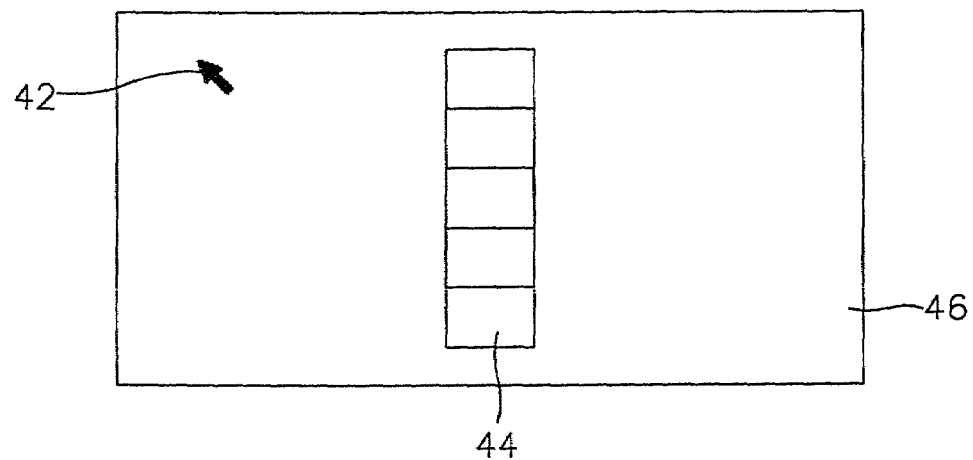
FIG. 4B is a screen when the menu of FIG. 4A is enlarged.

FIG. 4B shows a screen when the enlargement and reduction key 28 is pressed for the screen of FIG. 4A. In FIG. 4B, the menu 44 enlarged in response to the enlargement and reduction key 28 of the remote controller 100 is displayed.

Also, only the enlarged menu 44 is displayed on the screen.

As shown in FIG. 4B, the pointer 42 is located in the position before the menu 44 is enlarged. Thus, in order to select the menu item, the pointer 42 must be moved to the menu 44.

Figure 5A:
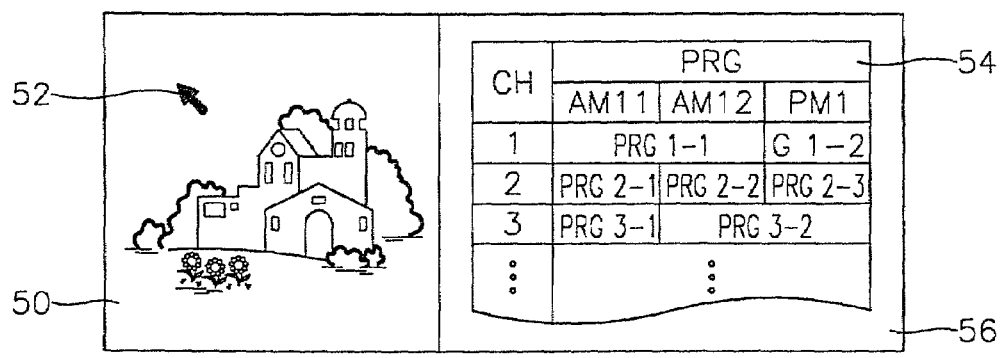
FIG. 5A is an example of a reduced program guide screen in the interface method.

In FIG. 5A, the program list which is reduced in response to the program guide key 30 of the remote controller 100 is displayed. In order to display the reduced program list, the screen of the television receiver 200 is divided into two parts. Here, a program image is displayed in one part, and the program list is displayed on the other part.

In FIG. 5A, reference numerals 50 denotes an area where the program image is displayed, 52 denotes a pointer, 54 denotes a program list and 56 denotes an area where the program list is displayed. As shown in FIG. 5A, the pointer is located in the area where the program image is displayed.

Figure 5B:
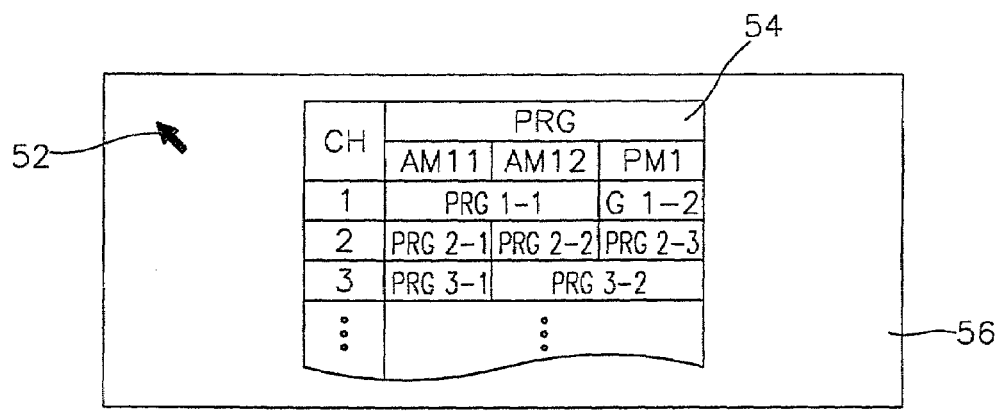
FIG. 5B is an example of when the program guide of FIG. 5A is enlarged.

In FIG. 5B, the program list 54 has been enlarged in response to the enlargement and reduction key 28 of the remote controller 100 and the enlarged program list is displayed. As shown in FIG. 5B, the pointer 52 is located in the position before the program list 54 is enlarged.

In a method for controlling the position of an indicator according to the present invention, in order to display a menu or a program list, the indicator is located in a menu area or a program list area, so that it is unnecessary to move the pointer to the menu area or the program list area.

Figure 6:
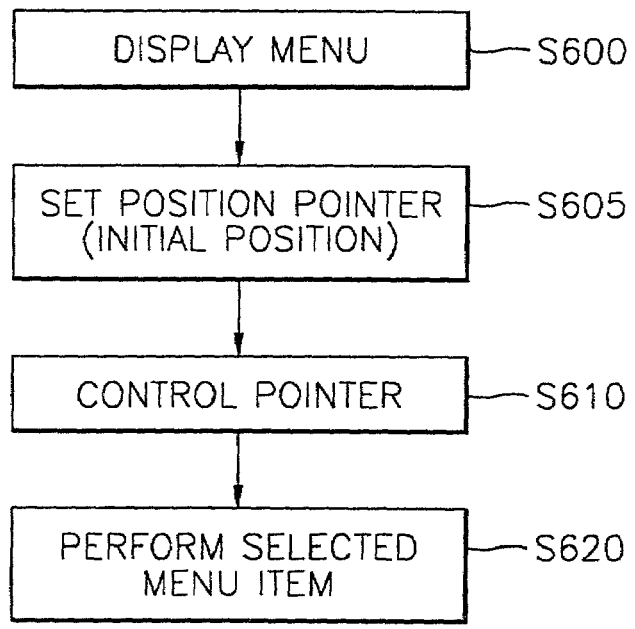
FIG. 6 is a flowchart of an embodiment of a method for controlling the position of an indicator according to the present invention.

In a method shown in FIG. 6, a sub menu 36 is displayed on a screen in response to the menu key 26 of the remote controller 100 (S600).

The pointer 32 is located in the sub menu area (S605). When the sub menu 36 is displayed, the pointer 32 is located on the sub menu area, so that the sub menu item can be easily selected.

Then, the position of the pointer 32 is controlled in response to the trackball 22 of the remote controller 100 (S610).

The remote controller 100 periodically transmits the amount of change in the x and y-directions in accordance with operation of the trackball 22, in order to move the pointer 32. In the television receiver 200, a new coordinate value is calculated by adding the amount of change transmitted by the remote controller 100 to the coordinate value where the pointer 32 is located, and the pointer is displayed on the calculated coordinate value.

Then, the sub menu allocated to the sub menu item where the pointer 32 is located is performed in response to the selection key 24 of the remote controller 10 (S620).

By the method of FIG. 6, the pointer 32 is located on an area where the sub menu 36 is displayed so that the sub menu item can be selected by minimum operation.

Figure 7:
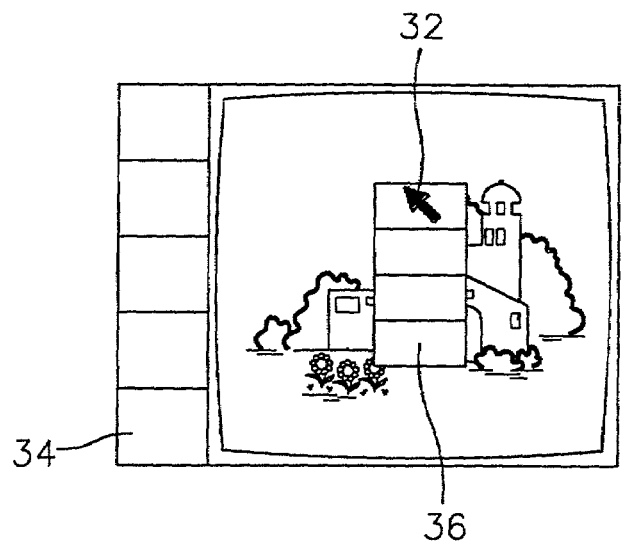
FIG. 7 shows a screen generated by the method of FIG. 6.

The position where the pointer 32 is located may be the first sub menu item. FIG. 7 shows a screen which results from performing step 605. Comparing the interface method illustrated by FIG. 3B to the method for controlling a position of an indicator according to the present invention of FIG. 7, when the sub menu 36 is displayed, the pointer 32 is located in the sub menu area so that time for moving the pointer 32 to the sub menu area is reduced.

As shown in FIG. 6, when the sub menu 36 is erased, the pointer 32 is located in the selected menu item. Thus, the selected item is stored, and the pointer is located in the stored menu item when the sub menu 36 is erased.

Figure 8:
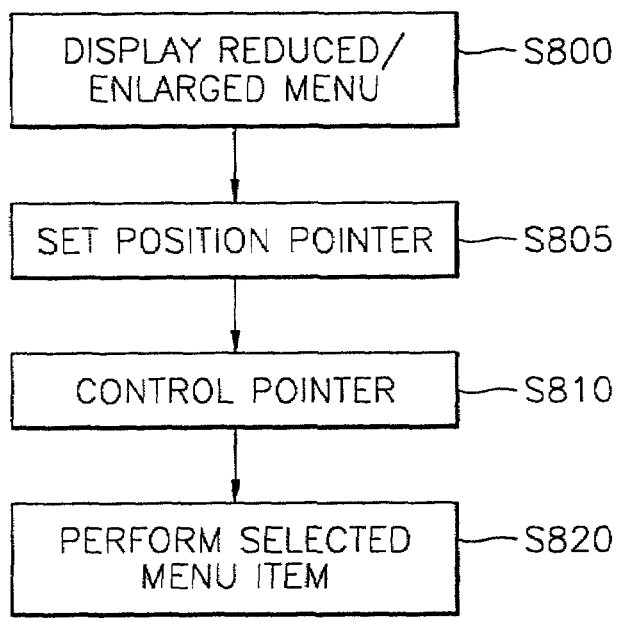
FIG. 8 is a flowchart of another embodiment of a method for controlling a position of an indicator according to the present invention.

Referring to FIG. 8, the menu reduced in response to the menu key 22 of the remote controller 100 is displayed, and the menu is enlarged and reduced in response to the enlargement and reduction key 28. In reducing the menu, the screen of the television 200 is divided into two parts. A program image is displayed in one part, and a menu is displayed in the other part (S800). Only the enlarged menu is displayed on the screen.

Figure 9A:
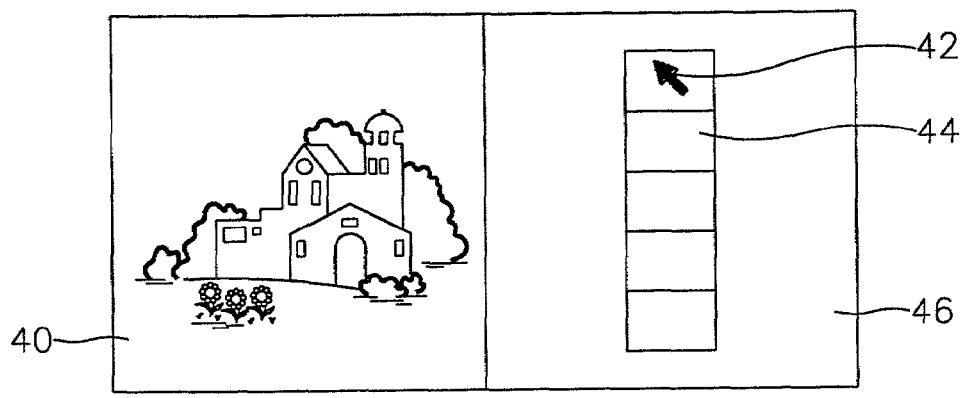
FIG. 9A shows a reduced menu of a screen generated by the method of FIG. 8.
Figure 9B:
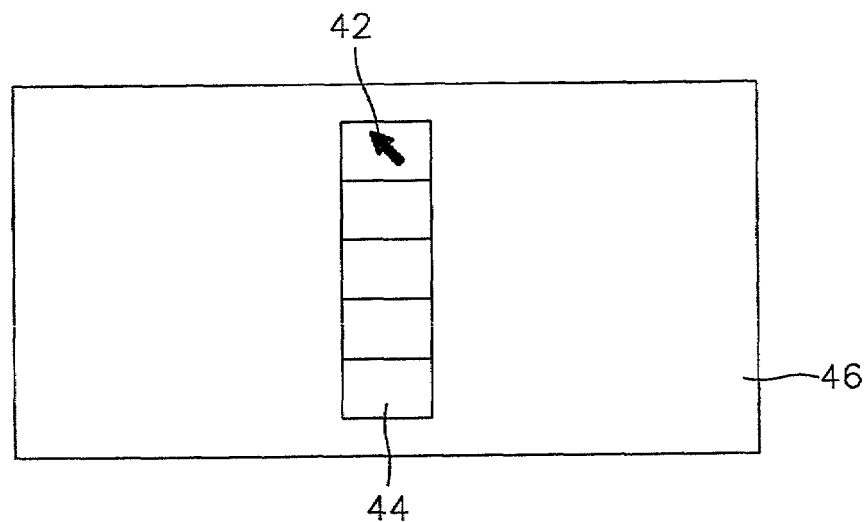
FIG. 9B shows an enlarged menu of a screen generated by the method of FIG. 8.

Referring also to FIGS. 9A and 9B, the pointer 42 is located on the menu area (S805). In order to reduce or enlarge the menu 44, the pointer 42 is located on the menu area so that the menu item can be easily selected.

The position where the pointer 42 is located may be the first menu item.

FIGS. 9A and 9B show reduced and enlarged menu screens that result from performing step 805.

Comparing the interface method of FIG. 4A to the method for controlling the position of an indicator according to the present invention, when the reduced menu is displayed, the pointer 42 is located in a menu area so that the time taken to move the pointer 42 to the menu area is reduced.

Also, comparing the interface method of FIG. 4B to the method for controlling the position of an indicator of FIG. 9B according to the present invention, when the enlarged menu is displayed, the pointer 42 is located in the menu area so that the time taken to move the pointer 42 to the menu area is reduced.

The position of the pointer 42 is controlled in response to the trackball 22 of the remote controller 100 (S810).

The television receiver 200 performs a command allocated to the menu item where the pointer 42 is located in response to the selection key 24 of the remote controller 100 (S820). When the selected menu item includes the sub menu, the sub menu and the pointer are displayed according to the method of FIG. 6.

The method of FIG. 8, which is adopted to the case of reducing and enlarging the menu, can be adopted to the case of changing the position of the menu. Here, the position of the pointer is moved by the moving degree of the menu.

Figure 10:
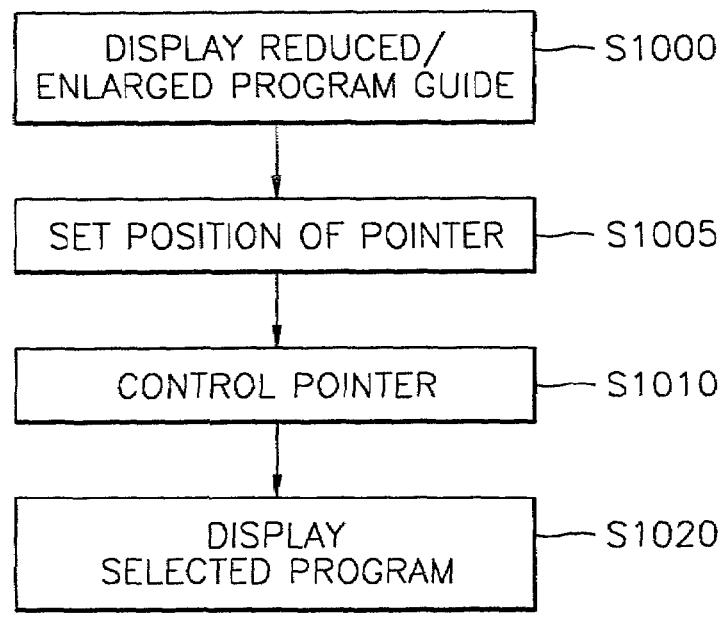
FIG. 10 is a flowchart of still another embodiment of a method for controlling the position of an indicator according to the present invention.
Figure 11A:
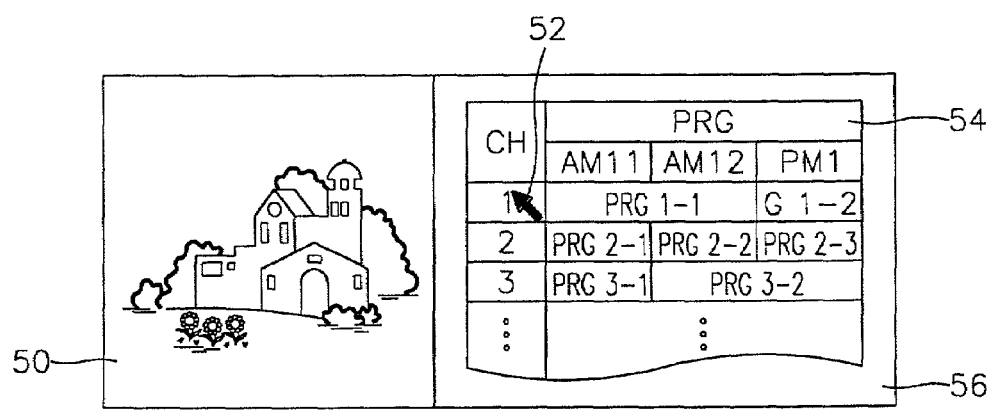
FIGS. 11A and 11B are screens generated by the method of FIG. 10.
Figure 11B:
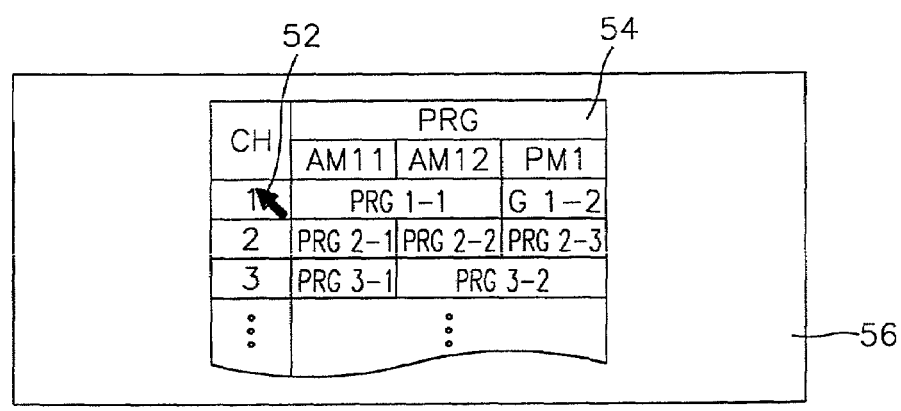

In the method of FIG. 10, a reduced program list is displayed in response to the program guide key 30 of the remote controller 100, and the enlarged or reduced program list is displayed in response to the enlargement and reduction key 28. In order to display the reduced program list, the screen is divided into two parts. Referring also to FIGS. 11A and 11B, a program image is displayed in one part, and a program list 54 is displayed in the other part (S1000).

Only the enlarged program list 54 is displayed on the screen.

The pointer 52 is located in a program list area (S1005). When the program guide image is displayed, the pointer 52 is located in the program list area so that a desired program can be easily selected.

An item where the pointer 52 is located may be the first channel.

FIGS. 11A and 11B which show screens resulting from step 1005 show reduced and enlarged program lists.

Comparing the interface method of FIG. 5A to the method for controlling the position of an indicator of FIG. 11A according to the present invention, when the program list is displayed, the pointer 52 is located in a program list area so that the amount of time taken to move the pointer 52 to the program list area is reduced.

Comparing the interface method of FIG. 5B to the method for controlling a position of an indicator of FIG. 11B according to the present invention, when the enlarged program list is displayed, the pointer 52 is located in the program list area so that the amount of time taken to move the pointer 52 to the program list area is reduced.

The position of the pointer 52 is controlled in response to the trackball 22 of the remote controller 100 (S1010).

The television receiver 200 performs a command allocated to the item where the pointer 52 is located in response to the selection key 24 of the remote controller 100 (S1020). When a channel is selected, detailed information on the channel is displayed, and when a program is selected, detailed information on the selected program is displayed.

Figure 12:
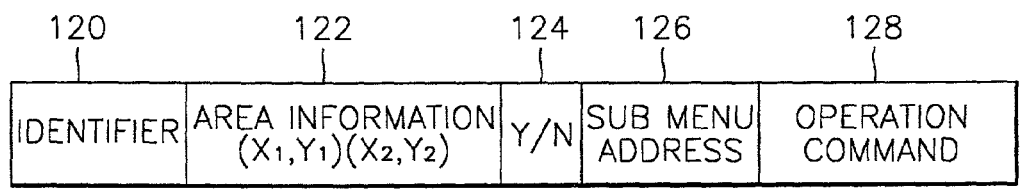
FIG. 12 shows the structure of data for menu items.

Referring to FIG. 12, data for the menu item includes an identifier 120, area information 122, information 124 indicating whether the sub menu exists or not, address information 126 indicating a position where information on a sub menu is stored, and command information 128

The identifier 120 indicates the name of the menu item. The area information 122 indicates coordinate information of areas where the corresponding menu item is displayed, and has coordinate information of two points of a diagonal line of a general tetragon. When the selection key 24 is pressed, the television receiver 200 determines to which area information the coordinate value where the pointer is located belongs and identifies the selected menu item.

Figure 13:
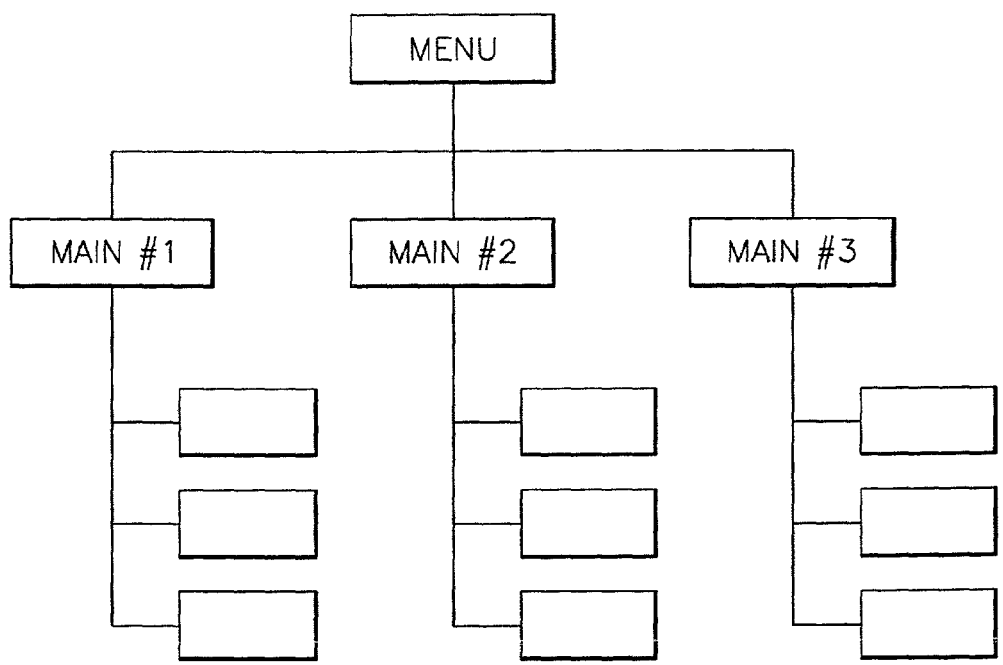
FIG. 13 is for showing the relationship between menu items and sub menu items thereof.

The menu item has sub menus so that the menu has a tree structure as shown in FIG. 13. In FIG. 13, main menu items main #1, main #2, and main #3 have respective sub menus.

Figure 14:
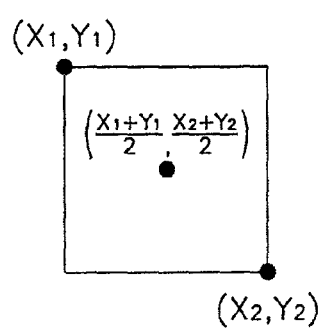
FIG. 14 shows an example of a menu item region displayed on a screen.

Menu items of FIG. 14 have an area of a tetragon indicated by (x1, y1)(x2, y2). The pointer is located at the center point of the tetragonal area of the menu item. The coordinates of the center point of the tetragon area are ((x1+x2)/2, (y1+y2)/2).

When the menu screen is displayed, the pointer is located in the first item of the menu screen. In FIG. 6, the coordinates where the pointer is located are ((x1+x2)/2+x,(y1+y2)/2). Here, reference character x indicates an offset in accordance with reduction and enlargement of the menu which is a value from the left of the screen. When the position of the menu is changed, the movement amount $(x_m, y_m)$ of the menu is adopted.

Figure 15:
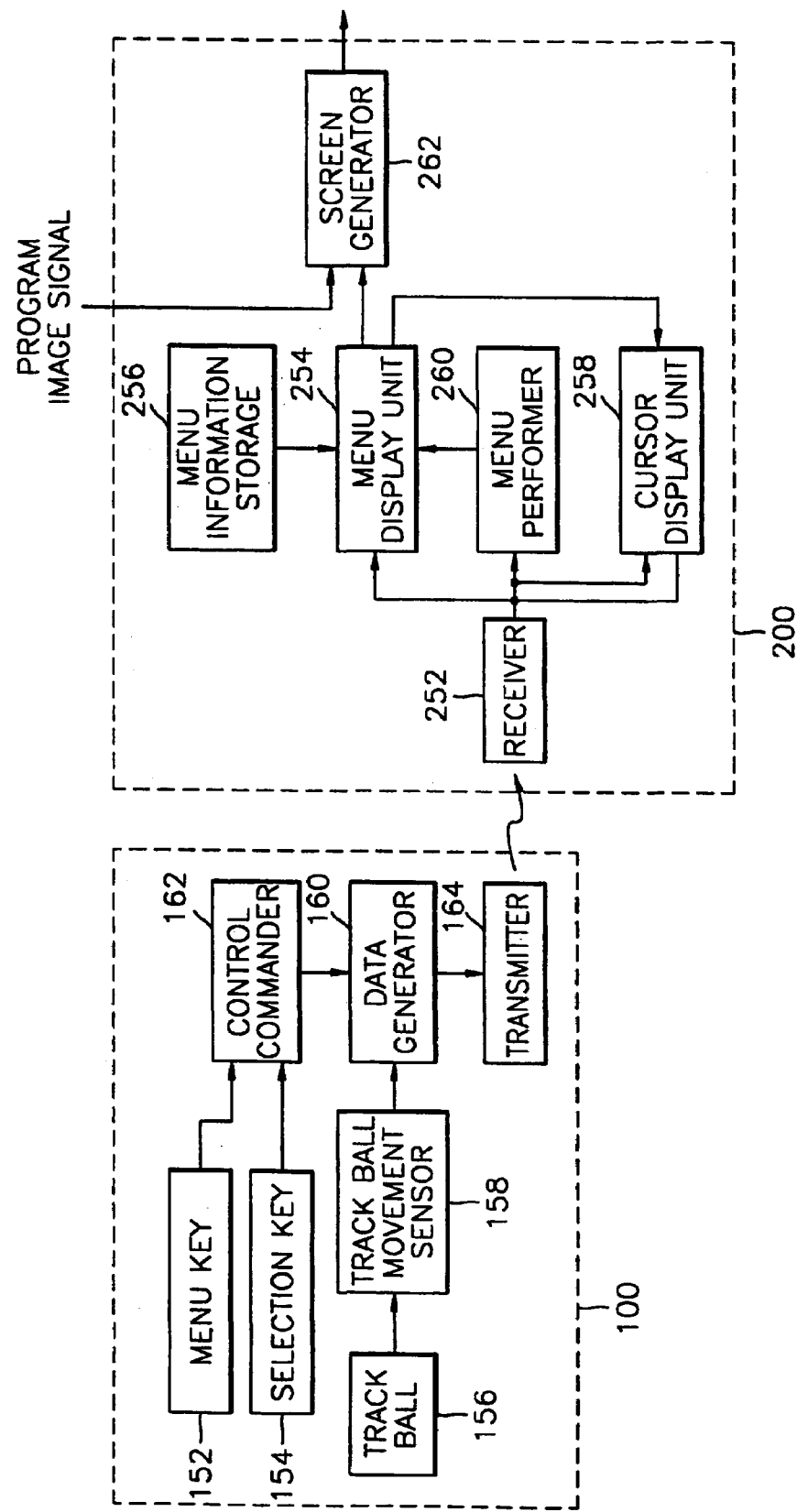
FIG. 15 is a block diagram showing the structure of an apparatus in which the method of FIG. 6 is used.

FIG. 15 shows a more detailed view of the remote controller 100 and the television receiver 200 of the present invention. The remote controller 100 includes a menu key 152, a selection key 154, a trackball 156, a trackball movement sensor 158, a data generator 160, a control commander 162 and a transmitter 164.

The television receiver 200 includes a receiver 252, a menu display unit 254, a menu information storage unit 256, a pointer display unit 258, a menu performer 256 and a screen generator 262.

When the menu key 152 of the remote controller 100 is pressed, the data generator 160 generates a menu display command.

The menu display unit 254 obtains information of the main menu from the menu information storage unit 256 in response to the menu display command received through the receiver 252, and displays the main menu corresponding thereto.

At this time, the pointer display unit 258 displays the pointer on a center point with reference to the area information of the item where the pointer is to be located.

When the trackball 156 is moved to select the corresponding menu item from the menus displayed on the screen, the trackball movement sensor 158 senses the movement of the trackball 156 in the x and y-directions. The data generator 160 periodically generates a pointer movement command which includes the amount of change in position sensed by the trackball movement sensor 158. The pointer movement command of the data generator 160 is transmitted by the transmitter 164.

The receiver 252 receives a pointer movement signal generated by the transmitter 164 of the remote controller 100. The pointer display unit 258 controls the position of the pointer in response to the received pointer movement signal.

When the selection key 154 of the remote controller 100 is pressed, the menu performer 260 performs a command of the menu item where the pointer is located in response to the menu item selected by the selection key 154.

When the selected menu item includes sub menu items, the menu performer 260 controls the menu display unit 254 to thereby display the sub menu. The menu display unit 254 obtains information on the sub menu from the menu information storage unit 256 and displays the sub menu corresponding to the information.

The pointer display unit 258 displays a pointer in the center point of the item where the pointer is to be located, with reference to the area information.

The screen generator 262 overlaps the menu image signal generated by the menu display unit 254 with an image signal and supplies the overlapped signal to a display unit (not shown).

Figure 16:
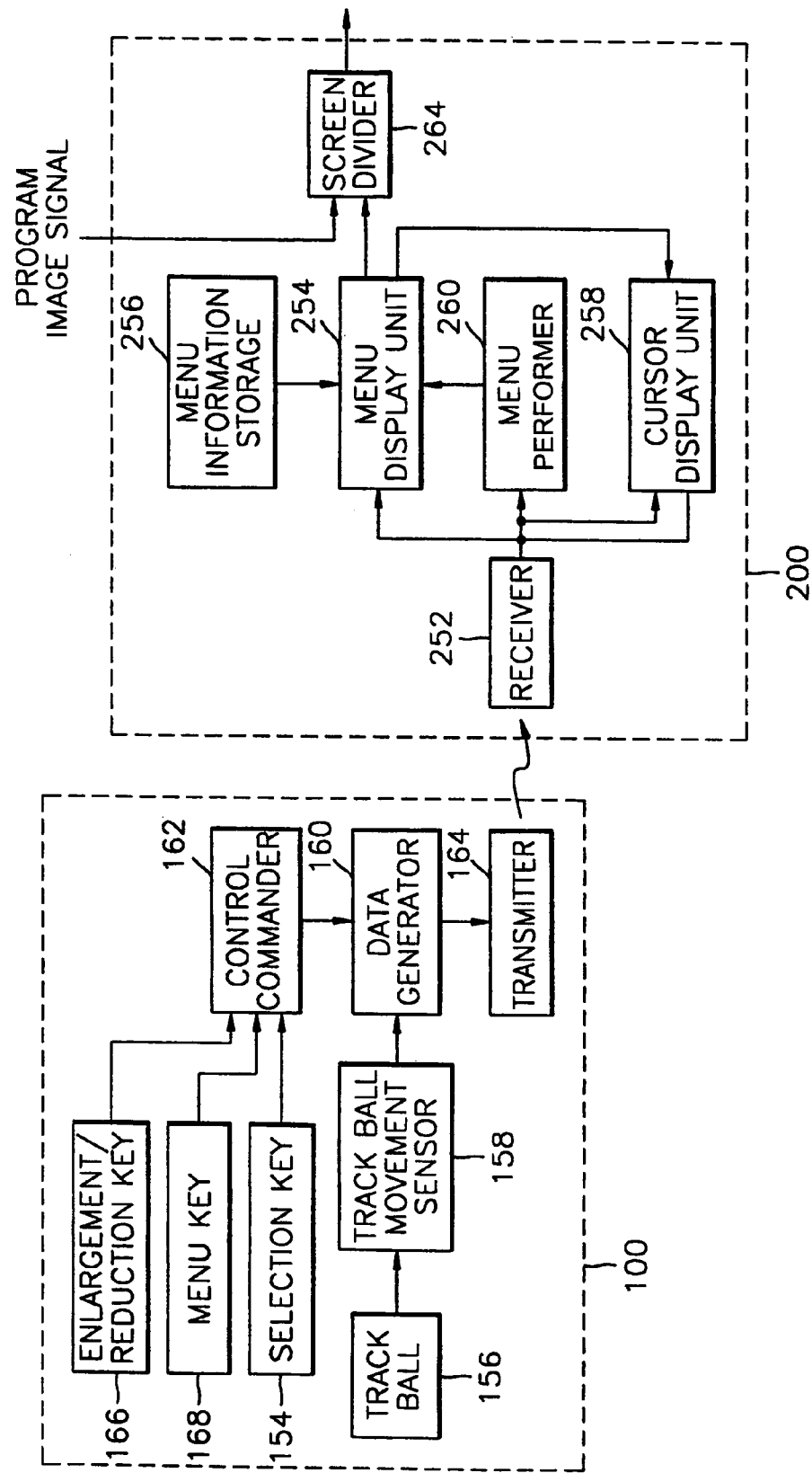
FIG. 16 is a block diagram showing the structure of another apparatus in which the method of FIG. 8 is used.

In FIG. 16, portions which perform the same operations as those of FIG. 15, are assigned by the same reference numerals.

In FIG. 16, reference numeral 166 denotes an enlargement and reduction key, and reference numeral 264 is a screen divider in which a menu image signal generated by the menu display unit 254 and a program image signal generated by a tuner (not shown) are synthesized or each signal is displayed.

When the enlargement and reduction key 166 of the remote controller 100 is pressed, the data generator 160 generates enlargement and reduction commands. When the enlargement and reduction key 166, a toggle key, is pressed once, the enlargement command is generated, and when the key is pressed once more, the reduction command is generated.

The menu display unit 254 obtains information on the main menu screen from the menu information storage unit 256 in response to the enlargement and reduction commands received through the receiver 252, and displays the corresponding menu.

At this time, the pointer display unit 258 displays the pointer in the center point of the item where the pointer is to be located, with reference to the area information.

The screen divider 264 synthesizes program image signal and menu image signal generated by the menu display unit 254 or displays each signal on the screen, and supplies the signals to a cathode ray tube (CRT, not shown).

Figure 17:
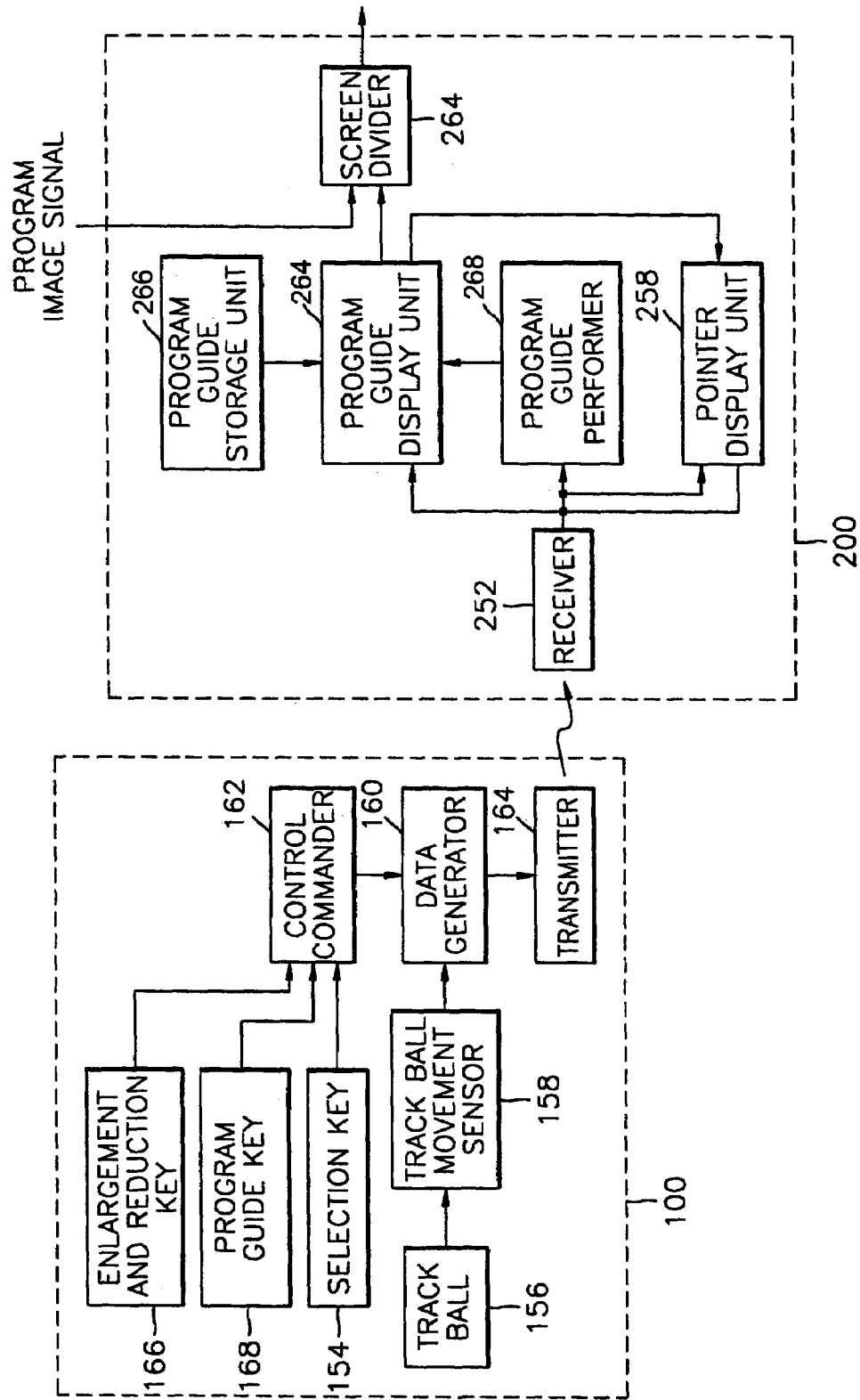
FIG. 17 is a block diagram showing the structure of an apparatus in which the method of FIG. 10 is used.

FIG. 17 is a block diagram showing the structure of an apparatus in which the method of FIG. 10 is used.

Portions of FIG. 17 which perform the same operations as those of FIG. 16, are assigned by the same reference numerals. In FIG. 17, reference numeral 266 denotes a program guide information storage for storing program guide information detected from the image signal. The program guide information includes a name of the program, guide information, and data of starting time and ending time.

The program guide information generator 264 obtains program guide information from the program guide information storage 266 in response to the program guide command received through the receiver 252, and generates a corresponding program guide image signal.

At this time, the pointer display unit 258 displays the pointer on the item with reference to the area information of the program item where the pointer is to be located.

When the enlargement and reduction key 166 of the remote controller 100 is pressed, the data generator 160 generates enlargement and reduction commands. When the enlargement and reduction key which is a toggle key is once pressed, the enlargement command is generated, and when the key is pressed once more, the reduction command is generated.

The program guide information generator 254 obtains program guide information from the program guide information storage 266 in response to the enlargement and reduction command received through the receiver 252, and displays corresponding enlargement and reduction program list.

At this time, the pointer display unit 258 displays the pointer in the center point with reference to the area information of the item where the pointer is to be located.

The receiver 252 receives a pointer movement signal generated by the transmitter 164 of the remote controller 100. The pointer display unit 258 controls the position of the pointer in response to the received pointer movement signal.

When the selection key of the remote controller 100 is pressed, corresponding command is performed. For instance, in order to select a program, the program guide performer 268 obtains a channel number of the program where the pointer is located and supplies the obtained channel number to the tuner.

When the reduced program list is displayed, the screen divider 262 synthesizes program image signals and program guide image signals generated by the menu display unit 254 or each signal is displayed, and supplies the signal to a display unit (not shown).

The present invention in which a selection item is commanded by a pointer has been described, can be adopted to the case of changing colors of the selected item, i.e., highlighting or inverting colors of the selection item.

According to the interface method of the present invention, an indicator is located in one of the selection items when the selection items are displayed so that only a small amount of movement is required by the indicator, which enables easy interfacing with users.

What is claimed is:

1. A method, comprising the steps of:
 displaying a menu and an indicator for selecting one of menu items of said menu;
 making a selection of a menu item by using said indicator;
 displaying a sub menu corresponding to the selected menu item, with said sub menu being comprised of a plurality of sub menu items contextually related to said menu item;
 automatically adjusting the position of said indicator to be located within said sub menu;
 storing a location of the selected menu item within a display screen;
 automatically adjusting the display of said indicator to the stored location of the selected menu item when said sub menu is erased;
 initiating display of said menu on a display screen by manually pressing a selection key on said a remote controller;
 moving said indicator within said screen by manipulating a cursor controller mounted on said remote controller; and
 making said selection by manual manipulation of said selection key.

2. The method of claim 1, further comprised of automatically, initially displaying said indicator superimposed upon a first sub menu item of said sub menu upon displaying of said sub menu.

3. The method of claim 1, said indicator being a pointer.

4. The method of claim 1, said making step comprising user manipulation of a trackball on a remote controller causing said indicator to move on a display to the selected menu item followed by pressing a selection key on said remote controller, said automatically adjusting the position of the indicator step comprising sudden translation of said indicator across the display to the submenu at a time simultaneous with the displaying of the sub menu.

5. The method of claim 1, further comprising the step of erasing the submenu automatically causing said menu items to reappear and automatically and simultaneously causing said indicator to skip back to said previously selected menu item.

6. A television apparatus, comprising:
 a trackball on a remote controller adapted to control the movement of an indicator on a television display screen relative to a predetermined initial position of said indicator on the screen to select a displayed menu item;
 a trackball movement sensor sensing a shift value of the movement of said trackball along X-Y coordinates relative to the predetermined initial position of said indicator;
 a selection key which selects said menu items;
 a menu key which displays said menu on said television display screen;
 a shift value data storage unit accommodating the storing shift value data corresponding to to the movement of said trackball relative to the initial indicator position;
 a control commander selecting the control function corresponding to said menu item where said indicator is located when said selection key is activated;
 a data generator, responsive to said remote controller for generating data corresponding to the stored shift value of said trackball received from said shift value data storage unit when said remote controller is activated; and
 a transmitting unit accommodating coding and transmitting data from said data generator to an electrical appliance; and
wherein said electrical appliance comprises:
 a receiver accommodating the data transmitted by said transmitting unit;

a display control unit, connected to said receiver, displaying a menu on said television display screen according to said received data;

an indicator display unit, said indicator display unit displays said indicator in a center point of a selected submenu;

said television display screen;

a microprocessor; and a menu storage unit, connected to said display control unit, adapted to provide data which is displayed on said television display screen, the indicator display unit causing the location of the indicator on the television display screen to move on the display screen when the trackball moves, the indicator display unit also causing the indicator to suddenly and automatically jump to a new location on the television display screen when said television display screen displays a different menu.

7. The television apparatus of claim 6, further comprising an enlargement/reduction key adapted to cause the size and location of a displayed menu to suddenly change a size and a location on the display while simultaneously causing said indicator to jump to a new location within the changed menu when the enlargement/reduction key is depressed by the user, said jump in the location of the indicator not being brought about by said trackball.

8. The television apparatus of claim 6, the indicator display unit receiving manual movement of the indicator signals from the trackball movement sensor and automatic movement of the indicator from the command controller and moving the indicator based on a combination of signals from both of these sources.

9. The television apparatus of claim 6, the indicator display unit being configured to cause the location of the indicator on the television display screen to move on the display screen when the trackball moves, the indicator display unit also causing the indicator to suddenly and automatically jump to a new location on the television display screen when said television display screen displays a different menu.

10. The television apparatus of claim 6, the trackball enabling the indicator to gradually slide and not skip across the display screen.

11. A method of controlling a pointer on a display, comprising:

pressing a button on a control panel causing a main menu to appear and simultaneously and automatically causing the pointer to appear within the main menu, the main menu having a plurality of menu items, the pointer being automatically placed in a first of said plurality of menu items;

manually manipulating a device causing the pointer to gradually move to a user selected menu item; and pressing a button on the control panel causing selection of said menu item containing said pointer and thus automatically causing a sub menu to appear on the display and simultaneously, suddenly and automatically causing said pointer to move to said sub menu, said device that is manually manipulated to move the pointer being a track ball, both the trackball and the control panel being on a same remote controller, the remote controller not being directly attached to the display.

12. The method of claim 11, each menu item in said main menu being represented by a tetragon, the pointer being in a geometric center of said first of said plurality of said menu items.

13. The method of claim 11, said sub menu comprising a plurality of sub menu items, each sub menu item being represented by a tetragon, said pointer being initially located in a geometric center of a first or top sub menu item.

14. The method of claim 11, further comprising causing said submenu to disappear, causing said display to display said main menu with the pointer in said previously selected menu item of said main menu.

15. The method of claim 14, said pointer automatically reappearing in said previously selected menu item in said main menu without any user manipulation of any control when said main menu reappears.

16. The method of claim 15, the pointer reappearing at a geometric center of the previously selected menu item.

17. The method of claim 11, further comprising pressing a button on said control panel causing an image on the display to disappear and causing said main menu to appear enlarged, said pointer being automatically moved to said enlarged main menu on said display without any further user manipulation.

18. The method of claim 11, said control panel being on a remote control device physically separated from the display.

19. The method of claim 11, said main menu disappearing from the display when said submenu appears.

20. The method of claim 11, the manual manipulating step being accomplished by moving a trackball, said trackball causing the pointer to slide and not skip across the display.

21. A method of controlling the location of a pointer on a display, comprising:

displaying a main menu having a plurality of menu items while simultaneously displaying the pointer on the display;

moving a location of the pointer on the display to one of said plurality of menu items on said main menu via user manipulation of a trackball;

selecting said menu item where said pointer is present by user pushing a button on a control; and suddenly displaying a submenu comprising a plurality of sub menu items on said display while simultaneously and automatically having the location of the pointer on the display to skip to a location within said submenu, the trackball being on said control along with said button.

22. The method of claim 21, said submenu being distinguished from said main menu.

23. The method of claim 21, said main menu disappearing from the display when said submenu appears.

24. The method of claim 21, said display being a high definition television.

25. The method of claim 21, further comprising reverting back to the main menu from the submenu causing the main menu to reappear at a location on the display different from where the submenu appeared, causing the pointer to automatically skip back to said selected menu item on said main menu.

26. A method, comprising:

displaying an indicator and a main menu comprising a plurality of main menu items on a display;

moving the indicator to one of said plurality of main menu items on the display via manipulation of a trackball on a remote controller;

selecting said one of said plurality of main menu items by pressing a button on said remote controller; and displaying a sub menu related to said one of said plurality of main menu items, said indicator being automatically repositioned on the display within the sub menu.

27. The method of claim 26, said automatic repositioning of the indicator being accomplished without any further manipulation of the remote controller.

28. The method of claim 26, said sub menu comprising a plurality of sub menu items, said indicator being automatically repositioned to a first sub menu item of said of said plurality of sub menu items.

29. The method of claim 26, further comprising pressing a button on said remote controller when said sub menu is being displayed causing said display to display said main menu with said indicator being automatically repositioned to be located within said one of said plurality of main menu items.

30. A method, comprising:

providing a display displaying an indicator and a menu comprising a plurality of menu items, said indicator being located within one of a plurality of menu items in said menu; and pressing a button on a remote controller causing a size of said menu on said display to change while causing said indicator to be automatically repositioned within the changed menu, said indicator being automatically repositioned to said one of said plurality of menu items in said changed menu, said remote controller further comprising a trackball that is adapted to move the indicator.

31. A method, comprising:

providing a display displaying an indicator and a menu comprising a plurality of menu items, said indicator being located within one of a plurality of menu items in said menu; and pressing a button on a remote controller causing a size of said menu on said display to change while causing said indicator to be automatically repositioned within the changed menu, further comprising moving said indicator to said one of said plurality of menu items on said display via a trackball on said remote controller prior to said pressing.

32. A method, comprising:

providing a display displaying an indicator and a menu comprising a plurality of menu items, said indicator being located within one of a plurality of menu items in said menu; and pressing a button on a remote controller causing a size of said menu on said display to change while causing said indicator to be automatically repositioned within the changed menu, the changed menu comprising said plurality of menu items, the method further comprising pressing a button on said remote controller when said changed menu is being displayed, causing said menu to revert back to a size it was before being changed and causing said indicator to be automatically repositioned within said reverted main menu.

* * * * *